United States Patent
Saito (10) Patent No.: US 6,697,106 B1
(45) Date of Patent: Feb. 24, 2004

(54) APPARATUS FOR PROCESSING IMAGE SIGNALS REPRESENTATIVE OF A STILL PICTURE AND MOVING PICTURES PICKED UP

(75) Inventor: Osamu Saito, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/534,130

(22) Filed: Mar. 23, 2000

(30) Foreign Application Priority Data

Mar. 26, 1999 (JP) .......................................... 11-082693

(51) Int. Cl.[7] ............................................. H04N 5/228
(52) U.S. Cl. ................................ 348/222.1; 348/231.7; 348/333.01
(58) Field of Search .......................... 348/207.99, 207.1, 348/222.1, 231.99, 231.3, 231.6, 231.7, 333.01; 386/107, 117; 358/906

(56) References Cited

U.S. PATENT DOCUMENTS 5,153,730 A * 10/1992 Nagasaki et al. ......... 348/231.6

2003/0103148 A1 * 6/2003 Ejima et al. ............. 348/231.3

FOREIGN PATENT DOCUMENTS

| JP | A922379 | 1/1997 |
| JP | A10108116 | 4/1998 |

* cited by examiner

Primary Examiner—Tuan Ho
(74) Attorney, Agent, or Firm—Birch, Stewart, Kolasch & Birch, LLP (57) ABSTRACT

An image signal processing apparatus includes an image signal processing device for processing image signals output from an image pickup device. In a movie mode, image data output from the image signal processing device are input to a reproduction signal processing device via an image bus and an image display memory. As a result, a picture represented by the image data appears on a monitor. In a record mode, the image data output from the image signal processing device are written to a data recording medium in the form of codes via a CPU (Central Processing Unit) bus and a general memory and a compressing/expanding device connected to the CPU bus. The apparatus is capable of adequately processing and outputting both a still picture and a moving picture.

21 Claims, 7 Drawing Sheets

|  | STATE OF BUFFER |
|---|---|
| RECORD MODE | ON |
| MOVIE MODE | Hi (ON) |
| PLAY MODE | Hi |

…

APPARATUS FOR PROCESSING IMAGE SIGNALS REPRESENTATIVE OF A STILL PICTURE AND MOVING PICTURES PICKED UP

BACKGROUND OF THE INVENTION

1. Field of the Invention

The present invention relates to an image signal processing apparatus for processing an image signal output from an image pickup device or photoelectric transducer and representative of a desired scene and outputting a corresponding still picture signal. More particularly, the present invention relates to an image signal processing device advantageously applicable to a digital camera or similar image pickup equipment capable of outputting a moving picture made up of a plurality of frames.

2. Description of the Background Art

A digital camera is a recent achievement in the imaging art and capable of picking up a desired scene with an image pickup device implemented by a CCD (Charge Coupled Device) image sensor, processing the resulting image signal, and recording the processed image signal in a memory card, magnetic disk, magnetic tape or similar data recording medium. A digital still camera, for example, digitizes an image signal representative of a single picture and output from a bidimensional color image pickup device. The resulting color image data are encoded by compression based on a JPEG (Joint Photographic Expert Group) or similar still picture compression coding system and then written to a data recording medium.

More specifically, the digital camera processes a plurality of frames of image signals continuously output from the image pickup device and delivers resulting image data to a monitor implemented by a color LCD (Liquid Crystal Display) panel. This allows the operator of the camera to perform framing and focusing before recording a still picture while watching a picture appearing on the monitor, i.e., an electronic finder. In parallel with the spread of the digital camera, there is an increasing demand for pictures of higher quality. For higher picture quality, the camera has recently been loaded with a color image pickup device having more than 1,300,000 pixels in its photosensitive array. With such a high pixel density image pickup device, pictures comparable in definition with pictures available with a silver halide photosensitive type of film can be achieved.

Japanese patent laid-open publication No. 108116/1998, for example, discloses a digital still camera capable of processing an image signal with software and storing the resulting image data in a semiconductor memory.

However, the problem with the processing of an image signal representative of a high definition image with a high pixel density, image pickup device is that an increase in the number of pixels to be dealt with results in an increase in processing time and processing load. While Japanese patent laid-open publication No. 22379/1997 teaches a general processor implemented as a microcomputer, the general processor does not give consideration to functions or conditions necessary for constructing a camera. When digital signal processing units are constructed into a single chip, the microcomputer taught in the above document is directed toward rapid signal processing between the signal processing units.

However, when it comes to a digital camera, processing an image signal representative of a single picture, encoding it by compression and recording the resulting image data in a data recording medium increases the processing time with an increase in the pixel density of the image pickup device. Further, when an image signal is continuously processed in order to continuously display an image being picked up, i.e., to implement a finder function, the processing load increases with an increase in the number of pixels and causes the individual frame of the image being displayed to be delayed from the actual scene. The delay or time lag sequentially increases and renders the finder function insufficient. In addition, the increase in processing load makes it difficult to execute other necessary processing and thereby slows down the operation of the overall image pickup equipment. To simply enhance the high-speed processing of a camera, use may be made of a large scale, image signal processing circuit and a processor operable at a higher speed. This, however, would increase the cost of the camera and would render the camera too bulky to carry. Moreover, power consumption would be aggravated to limit the drive time available with a secondary battery or similar battery. For these reasons, it has been difficult to realize a digital camera easy to use, simple in construction, and operable at a high speed.

SUMMARY OF THE INVENTION

It is therefore an object of the present invention to provide an image signal processing apparatus capable of adequately processing both a still picture and moving pictures and outputting the processed pictures.

In accordance with the present invention, an image signal processing apparatus for processing an image signal output from an image pickup device includes an image signal processing device for processing the image signal and outputting the resulting image data to either one of a first and a second output. A first bus is connected to the first output for transferring the image data while a first storage is connected to the first bus for storing the image data. A recording device is connected to the first bus for processing the image data read out of the first storage in a format matching with a data recording medium and recording the resulting processed image data in the medium. A second bus is connected to the second output for transferring the image data output via the second output. A reproducing and outputting device is connected to the first bus and second bus for reproducing an image represented by the image data output via the second output and outputting the resulting reproduced image. A main controller is connected to the first bus for controlling the various sections of the apparatus and setting an operation mode. The image signal processing device includes an output selector for selectively outputting the image data to the first output or the second output. When moving picture data are to be output, the image signal processing device outputs the moving picture data to the second output, but does not output them to the first output. When the image data are to be recorded in the data recording medium, the image signal processing device outputs the image data to the first output. The reproducing and outputting device receives the image data on the first bus or the second bus in accordance with the operation mode, reproduces the image data, and outputs the reproduced image data to a monitor.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
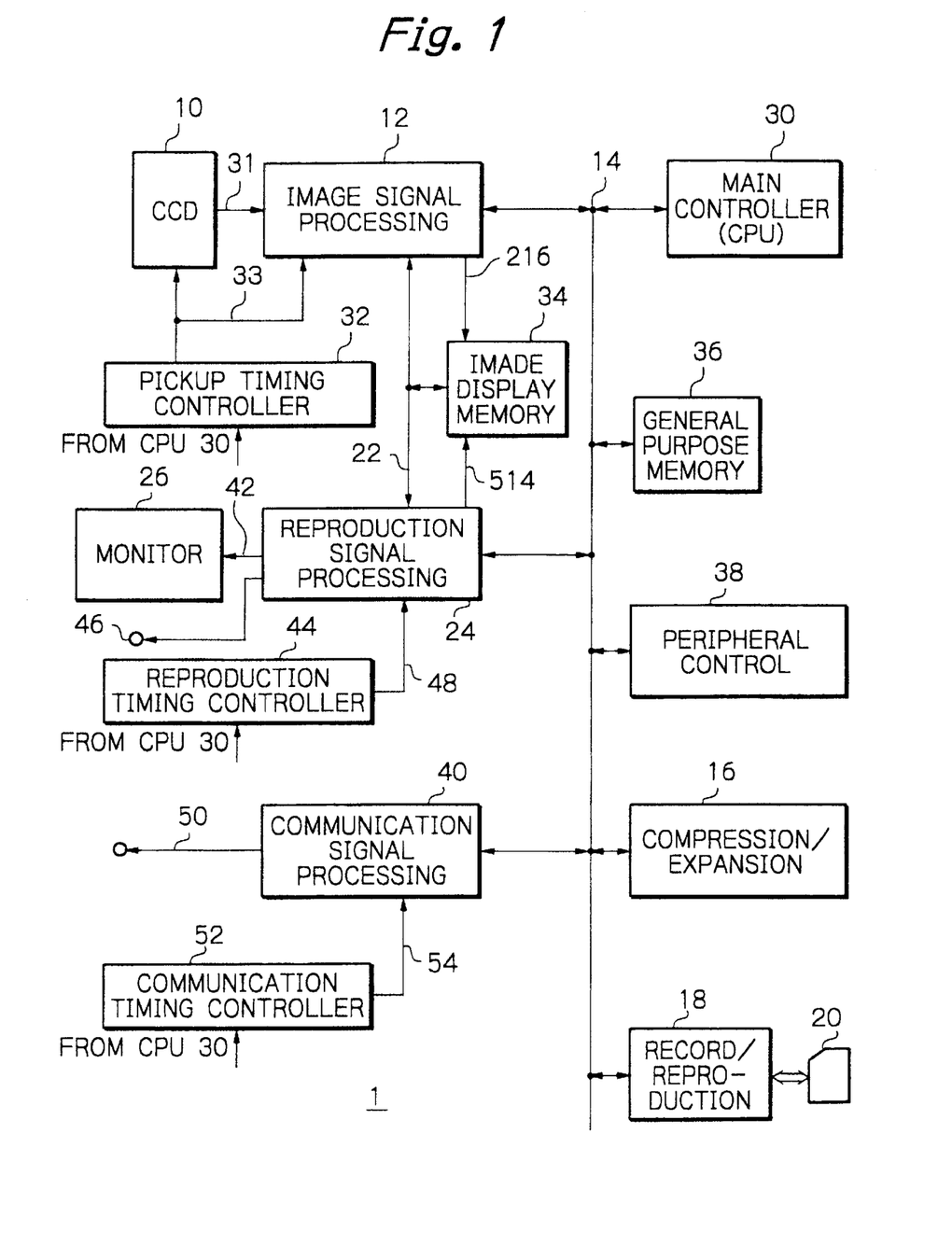
FIG. 1 is a block diagram schematically showing a digital camera to which an image signal processing apparatus embodying the present invention is applied.

Referring to FIG. 1 of the drawings, image pickup equipment to which an image signal processing apparatus embodying the present invention is applied is shown. The image pickup equipment is implemented as a digital still camera by way of example. As shown, the camera, generally designated with a reference numeral 1, includes an image pickup device or photoelectric transducer 10. The image pickup device 10 transforms an optical image incident thereto via a lens, a diaphragm and so forth, not shown, to an electric image signal. An image signal processing 12 processes the image signal output from the image pickup device 10.

The camera 1 is selectively operable in three different modes, i.e., a record mode, a movie mode, and a play mode. In the record mode, the image signal processing 16 delivers the processed image signal or image data to a compression/expansion 16 over a CPU (Central Processing Unit) bus 14. The compression/expansion 16 encodes the image data by compression and delivers the encoded image data to a record/reproduction 18. The record/reproduction 18 records the encoded image data in a memory card or similar data recording medium 20 removably mounted thereto.

In the movie mode, the processed image date output from the image signal processing 12 are fed to a reproduction signal processing 24 over an image bus 22. The reproduction signal processing 24 causes a color image corresponding to the input image data to continuously appear on a monitor 26 connected thereto. The movie mode allows the operator of the camera 1 to select a desired angle of field, focus the camera 1 on a desired object or otherwise prepare the camera 1 for a shot while watching the monitor 26 in place of the conventional optical finder. Further, in the play mode, image data stored in the data recording medium 20 are read out in order to display a corresponding reproduced image on the monitor 26.

Part of the camera 1 not directly relevant to the understanding of the present invention is not shown in FIG. 1 and will not be described specifically. In FIG. 1, signals are designated by the reference numerals attached to connection lines on which they appear.

The image pickup device 10 is implemented by a bidimensional color CCD image sensor including an array of photosensitive cells for photoelectric transduction and an R (red), G (green) and B (blue) color filter attached to the photosensitive array. Specifically, in the illustrative embodiment, photodiodes or photosensitive cells are arranged on the image pickup surface of the sensor in the horizontal and vertical array for forming more than 1,300,000 pixels, although not shown specifically. The R, G and B color filter is attached to the above image pickup surface in a G stripe, full checker pattern corresponding to the pixel arrangement. Further, microlenses each are assigned to a particular pixel for focusing the incident light image to the corresponding photodiode. This is successful to promote efficient focusing of the incident light to the individual pixel.

Charges are generated in the photosensitive array of the image pickup device 10 in dependent upon the electronic shutter time. The charges generated within an exposure time each are shifted to a vertical transfer CCD associated with the photosensitive cell and then vertically transferred in response to charge transfer pulses. The charges vertically transferred from the vertical transfer CCDs to horizontal transfer CCDs are sequentially read out via an output amplifier in the form of dot sequential, RGB image signals and delivered to the image signal processing 12 via an output 31. A pickup timing controller 32 causes the image pickup device 10 to perform the above operation by feeding drive signals 33 including reset pulse, charge transfer pulses and synchronizing signals (VI and HI) to the device 10.

Specifically, the pickup timing controller 32 generates the above drive signals 33 at preselected timings based on a reference clock. Among the drive signals 33, horizontal transfer pulses, a horizontal synchronizing signal (pickup timing control signal HI) and a vertical synchronizing signal (pickup timing control signal VI) are delivered to the image signal processing 12. In this manner, the pickup timing controller 32 defines a first time base in the image pickup section for driving the various blocks of the image pickup section.

The pickup timing controller 32 may drive the image pickup device 10 and image signal processing 12 in synchronism with the operation of a reproduction timing controller 44 which will be described later specifically. This allows an image signal synchronized at both of the image pickup side and reproduction output side to be generated and displayed. Further, a mechanical shutter may be used to control the exposure time of the image pickup device 10. In such a case, in the movie mode, a shutter is continuously opened in order to output a moving picture signal at a rate of fifteen to thirty frames for a second. When the shutter is released, the shutter is once closed to sweep out needless charges existing in the image pickup device 10. Subsequently, the shutter is again opened for a shutter speed time set by a main controller (CPU) 30, so that the image pickup device 10 outputs one frame of still picture signal corresponding to charges generated during the above time. Thereafter, the movie mode may be restored to continuously open the mechanical shutter, causing moving picture signals to be output again.

Figure 2:
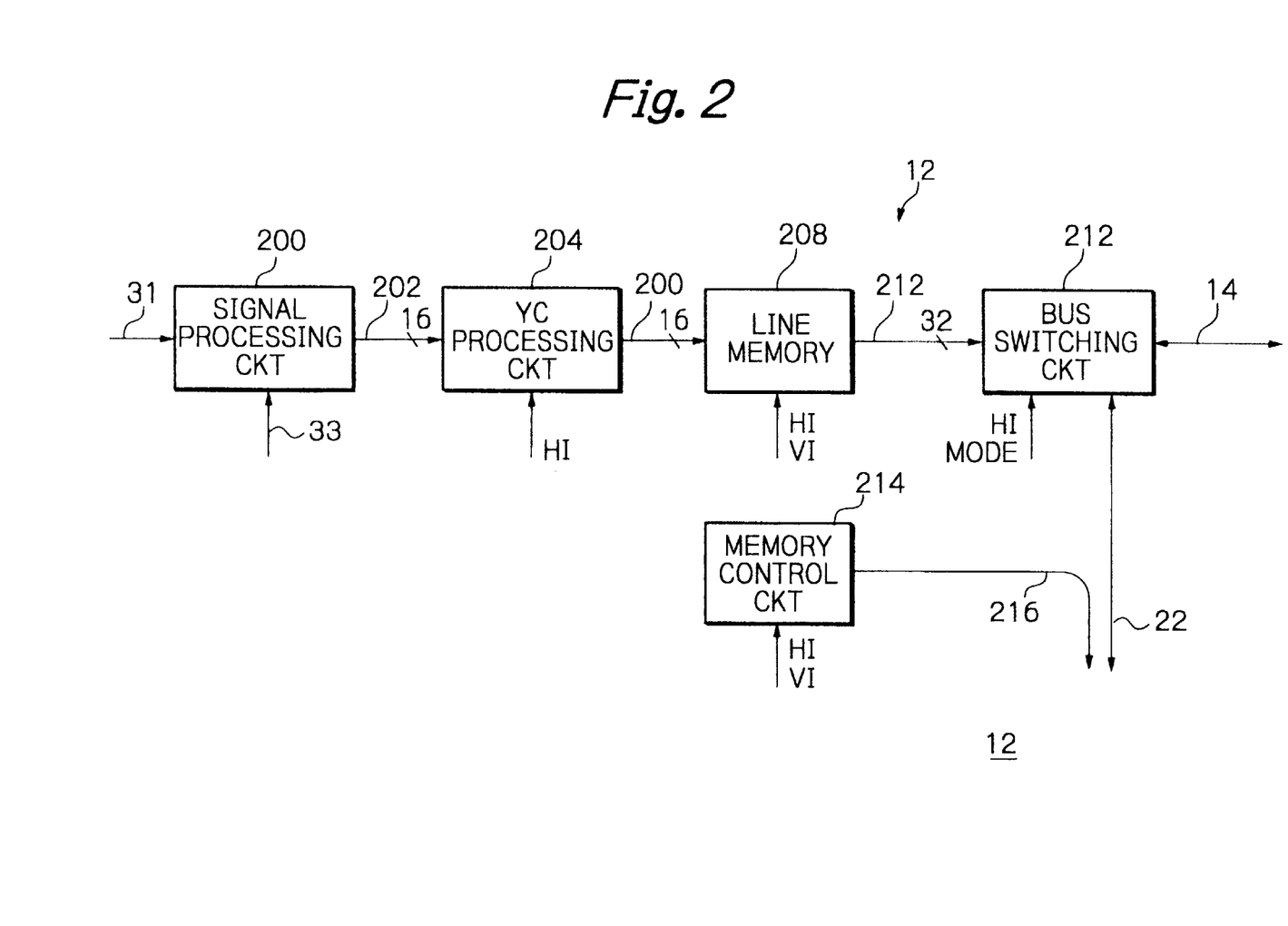
FIG. 2 is a schematic block diagram showing a specific configuration of an image signal processing section included in the illustrative embodiment.

The image signal processing 12 converts the image signals or pixel signals input thereto via the output 31 of the image pickup device 10 to digital image data. The resulting digital image data are fed to the CPU bus 14 having a different transfer bit width. Specifically, as shown in FIG. 2, the image signal processing 12 includes a signal processing circuit (CKT) 200 for executing analog and digital processing with the pixel signals coming in through the input 31. The signal processing circuit 200 has a processing circuit including a correlation double sampling (CDS) section for executing CDS with the pixel signals, a gain control amplifier for amplifying the pixel signals to preselected color-by-color levels, a clamping section for adjusting the reference level of the pixel signals, and a correcting section for executing white compression and gamma correction. Such sections of the processing circuit operate in accordance with the timing control signals (VI and HI) fed from the pickup timing controller 32. The signal processing circuit 200 additionally has an A/D (Analog-to-Digital) converter for converting each of the R, G and B image signals output from the above processing circuit to corresponding sixteen-bit digital image data.

When the movie mode, for example, is selected for effecting real-time output and display of the image signals representative of a scene being picked up, preselected one of the color-by-color digital image data output from the A/D converter are thinned, i.e., reduced in number. As a result, the image data to be output from the image signal processing 12 are thinned in the horizontal and vertical scanning directions in matching relation to a display size available with the monitor 26. Particularly, in the illustrative embodiment whose image pickup device 10 has a high pixel density, the image signal processing 12 reduces the amount of image data to be transferred in the movie mode.

If desired, those drive signals may be fed to the image pickup device 10 which are particular to the movie mode different from in the and record mode such that in the movie mode charges generated in the device 10 are thinned to adjust the amount of data, i.e., the image size. Further, assume that an economy mode is available with the camera 1 and set at the time of shooting for recording an image with a size smaller than the number of valid pixels of the device 10, e.g., a size of 640×480 pixels. Then, the image data are interpolated and reduced to the desired image size by pixel interpolation also in the record mode.

A YC processing circuit 204 is connected to the output 202 of the signal processing circuit 200 for transforming the input RGB color image data to YC image data, i.e., luminance (Y) data and chorominance (Cr and Cb) data. A line memory 208 is connected to the output 206 of the YC processing circuit 204. The line memory 208 plays the role of a buffer for transforming the input sixteen-bit YC image data to thirty-two-bit image data. Specifically, in the illustrative embodiment, the line memory 208 transforms a single sixteen-bit data unit representative of a pixel value to thirty-two-bit data matching with the bus width, and outputs two pixels of image data in parallel at a time in accordance with the bus cycle of the CPU bus 14.

A bus switching circuit or selector 212 is connected to the output 210 of the line memory 208 and selectively delivers the input image data to the CPU bus 14 or the image bus 22. Basically, the bus switching circuit 212 selects the CPU bus 14 in the record mode or selects the image bus 22 in the movie mode and play mode. In the record mode, the bus switching circuit 212 monitors the main controller 30 and selects, in response to a command fed from the controller 30, the CPU bus 14 also The image data are then delivered to the CPU bus 14 also.

Figure 3:
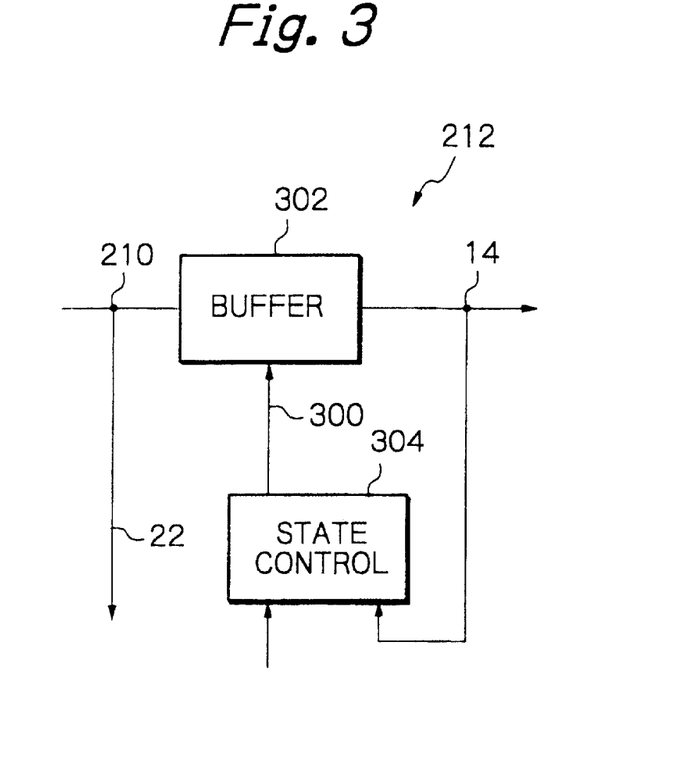
FIG. 3 is a schematic block diagram showing a specific configuration of a bus switching circuit included in the image signal processing section of FIG. 2.
Figure 4:
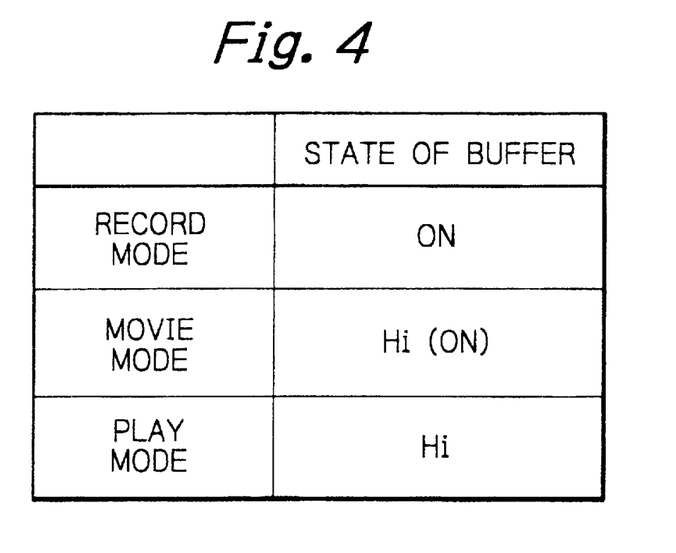
FIG. 4 is a table listing a relation between an operation mode and a state available with the bus switching circuit of FIG. 3.

FIG. 3 shows a specific configuration of the bus switching circuit 212. As shown, the bus switching circuit 212 includes a tristage buffer 302 receiving the bit-parallel signals via its input 210. The buffer 302 delivers the input signals to its output 14 in accordance with a control signal 300. A state control 304 generates the control signal 300 for controlling the output 14 of the buffer 302 to either a high/low level signal output state or a high impedance state. FIG. 4 shows a relation between the operation mode and the state of the buffer 302 of the illustrative embodiment. As shown, when the record mode is set, the state control 304 controls the output 14 of the buffer 302 to an ON state and thereby causes the buffer 302 to output the image data to the CPU bus 14. In the movie mode and play mode, the state control 304 controls the output 14 to the high (Hi) impedance state.

Further, the state control 304 monitors the CPU bus 14 to see if a command from the main controller 30 appears thereon. When a command commanding the output of the image data to the CPU bus 14 appears, the state control 304 controls the buffer 302 to an ON state with the control signal 300. For example, when the above command appears on the CPU bus 14 in the movie mode, the state control 304 causes the buffer 302 to output the input image data to the CPU bus 14. In this case, the image data are used to calculate estimated values for automatic focus adjustment, exposure adjustment and other image pickup control.

With the above configuration, in the movie mode, the illustrative embodiment maintains the CPU bus 14 idle and delivers the image data subjected to movie processing to the image bus 22. The output of the bus switching circuit 212 constitutes the output of the image signal processing 12. The image data appearing on the output 14 are written to a general memory 36 under the control of the main controller 30 and a peripheral controller 38 effecting DMA (Direct Memory Access) transfer control and memory control.

The image signal processing 12 further includes a memory control circuit 214 for generating memory addresses. The image data are written to the addresses of an image display memory 34 (see FIG. 1) designated by the above memory addresses. The image display memory 34 is connected to the image bus 22. Specifically, in the movie mode, the memory control circuit 214 generates address data and a write control signal and delivers them to a control bus 216. The image bus 22 is connected to the image display memory 34 and reproduction signal processing 24 while the control bus 216 is connected to one of two address ports of the image display memory 34. The other address port of the image display memory 34 is connected to the reproduction signal processing 24.

The image data appearing on the image bus 22 are temporarily written to the image display memory 34 under the memory control of the image signal processing 12 and then read thereoutof under the memory control of the reproduction signal processing 24. The image data read out of the memory 34 are fed to the image bus 22. In the illustrative embodiment, the memory 34 is implemented by a general DRAM (Dynamic Random Access Memory). Alternatively, for the memory 34, use may be made of a video RAM implemented by a dual port memory or a FIFO (First-In First-Out) type field memory, in which case the RAM includes the address control function.

Referring again to FIG. 1, the main controller 30, general-purpose memory 36, peripheral control 38 and compression/expansion 16 are connected to the CPU bus 14 which is, in turn, connected to the output 14 of the image signal processing 12. Also connected to the CPU bus 14 are the record/reproduction 18, reproduction signal processing 24, and a communication signal processing 40.

The main controller or CPU 30 controls the entire camera 1 and may advantageously be implemented by an RISC (Reduced Instruction Set Computer) type microprocessor. The main controller 30 processes calculation instructions and transfer instructions in parallel by way of a plurality of stages including a command fetching stage, a command decoding stage, a command executing stage, and a calculation result outputting stage. In the illustrative embodiment, the main controller 30 dynamically controls the automatic adjustment of exposure, focus and other factors at the time of a shot and controls, in the record mode, the writing and reading of the image data out of the general memory 36 (memory control function). Also, the main controller 30 collectively controls the operations of the compression/expansion 16 and record/reproduction 18.

The main controller 30 hands over the image data transfer control to the peripheral control 38. The peripheral control 38 includes a DMA controller and an interrupt controller for transferring, on the above hand-over of the image data transfer control, the image data output from the image signal processing 12 to the CPU bus 14 to the reproduction signal processing 24 and communication signal processing 40 and further to the compression/expansion 16 and record/reproduction 18 by DMA transfer. With the peripheral control 38, it is possible to reduce the period of time over which the main controller 30 occupies the CPU bus 14.

Further, the main controller 30 selectively sets up the movie mode for monitoring a moving picture being picked up or the record mode for recording a still picture picked up in the data recording medium 20 and controls the various blocks of the camera 1 in accordance with the mode set up. In the illustrative embodiment, in the movie mode, the controller 30 additionally causes the monitor 26 to display the moving pictures and sends the moving picture data by communication. In the illustrative embodiment, the pictures in the movie mode is displayed without occupying the CPU bus 14. By using the idle CPU bus 14, the controller 30 is capable of encoding the image data stored in the general memory 36 by compression, decoding image data read out of the data recording medium 20, or transferring such data to the communication signal processing 40.

At the above instant, the controller 30 is capable of thinning and interpolating the image data read out of the general memory 36 in order to enlarge, reduce or otherwise resize the image or to trim it. The resized or trimmed image data are transferred to the image display memory 34 via the reproduction signal processing 24 and image bus 22, so that the image being displayed can be subjected to real-time processing. The resizing or trimming function may be assigned to the reproduction signal processing 24, if desired. When the controller 30 feeds a command for causing the image signal processing 12 to output the image signal to the CPU bus 14, the processing 12 is capable of outputting the image data to the CPU bus 14 even in the movie mode.

The main controller 30 executes image pickup control by use of the above image data output to the CPU bus 14 in the movie mode. For example, on detecting a first stroke assigned to a shutter release button, not shown, the controller 30 performs automatic exposure (TTL-AE) control for controlling the aperture of a diaphragm, not shown, and a shutter speed on the basis of a luminance data represented by data being picked up. At this instant, the controller 30 may control the gain of the image signal processing 12 for amplifying the image signals. Further, by using the image data output to the CPU bus 14 in the movie mode, the controller 30 separates the contrast component of the scene being picked up and executes, e.g., contrast detection type automatic focus adjustment (TTL-AF), i.e., adjusts the focal point of the lens in accordance with the contrast in a preselected focusing area. On detecting a second stroke assigned to the shutter release button after such pickup control, the controller 30 switches the operation mode from the movie mode to the record mode.

Assume that the main controller 30 does not have to execute the pickup control in the movie mode or does not have to, e.g., change the number of pixels in the play mode. Then, the controller 30 is capable of shifting itself to a sleep state by interrupting the processing or lowering the processing speed in accordance with an operation clock. In the sleep state, the controller 30 reduces the transitions of the calculating circuits between the high (Hi) level and the low (Low) level and thereby saves power which the controller 30 needs. Particularly, when the camera 1 is powered by a secondary battery or similar battery, the sleep state is successful to drive the camera 1 over a longer period of time, i.e., to increase the number of recordable pictures available with the battery.

The main controller 30 sets up the movie mode when, e.g., the operator turns on a power switch, not shown, provided on the camera 1 and then turns on a display switch included in an operation panel not shown. Also, the controller 30 sets up the record mode when the operator turns on a shutter release switch also included in the operation panel. More specifically, the main controller 30 is capable of selecting either one the movie mode and record mode only if a mode set dial or similar mode setting means, not shown, is held in a usual shoot mode position. When the operator turns the mode set dial to a play position, the controller 30 sets up the play mode. Further, when the operator selects a delete mode on the mode set dial, the controller 30 reproduces and outputs a frame designated by the operator. When the operator selected the delete mode presses a preselected button for deletion, not shown, the controller 30 deletes, among the image data stored in the data recording medium 20, the image data designated by the same frame number as the frame of a picture being displayed.

The general memory 36 has a storage area great enough to accommodate one frame of still picture data output from the image signal processing 12 to the CPU bus 14 in the record mode. Specifically, when the image data are output from the image signal processing 12 to the CPU bus 14 in the record mode, the image data are temporarily written to the general memory 36 under the control of the main controller 30 and peripheral controller 38. Also, the above storage area serves as a work area when the compression/expansion 16 compresses or expands image data or when pickup control is executed in accordance with image data. If the general memory 36 has a capacity great enough to accommodate a plurality of frames of non-compressed image data, a plurality of frames of still pictures may be continuously picked up by the pickup device 10 at preselected intervals and entirely or partly compressed. This allows only the still pictures of desired frames to be written to the image recording medium 20.

The general memory 36 additionally stores program data to be used by the main controller 30 in preselected part of its storage area, allowing the controller 30 to control the various sections of the camera 1 in accordance with the program data.

In the play mode, the record/reproduction 18 reads image data out of the data recording medium 20 and transfers them to the compression/expansion 16. The compression/expansion 16 decodes the image data and then temporarily stores them in the general memory 36. The image data stored in the general memory 36 are transferred to the image display memory 34 on the CPU bus 14, reproduction signal processing 24, and image bus 22.

The compression/expansion 16 encodes the image data read out of the general memory 36 by non-real-time compression and delivers the encoded image data to the record/reproduction 18 and communication signal processing 40 via the CPU bus 14. Further, the compression/expansion 16 expands coded data fed from the record/reproduction 18 and delivers the expanded image data to the reproduction signal processing 24 and communication signal processing 40. The compression/expansion 16 may use the JPEG system which compresses image data with a bidimensional DCT (Discrete Cosine Transform) scheme, assigns Huffman codes to the compressed image data, and thereby generates encoded data smaller in length than a target length. If the data recording medium 20 has a capacity sufficiently greater than the amount of image data representative of a single frame, the image data may be written to the medium 20 without compression, i.e., in a high quality, non-compression record mode. In addition, for the compression of the image data, use may be made of a reversible compression mode also available with the JPEG system.

The record/reproduction 18 records the encoded data output from the compression/expansion 16 in the data recording medium 20 in a preselected format or reads image data out of the medium 20 and delivers them to the CPU bus 14. The medium 20 is, e.g., a memory card or a magnet-optical disk removably mounted to the record/reproduction 18. As for a recording medium implemented by a semiconductor memory, use may advantageously be made of conventional smart media, ATA (AT Attachment) cards or similar PC cards. The record/reproduction 18 transforms the encoded data to an EXIF (Exchangeable Image File Format) and writes them in the medium 20.

The reproduction signal processing 24 and communication signal processing 40 connected to the CPU bus 14 each receive the thirty-two bit image data transferred on the bus 14 by DMA transfer, reproduce and process the image data, and output the processed image data. Specifically, the reproduction signal processing 24 reproduces image signals in accordance with a second time base, i.e., a reproduction time base defined by the reproduction timing controller 44 for displaying adequate moving pictures on the monitor 26.

The reproduction signal processing 24 is an output interface for processing the image data appearing on the image bus 22 in accordance with the destination, and delivering the processed image data to the monitor 26. More specifically, the processing 24 transforms the YC data to digital RGB data and feeds the RGB data to the monitor 26. Further, the processing 24 generates an analog video signal matching with equipment connected to an output terminal 46 and delivers the video signal to the output terminal 46. In addition, the processing 24 has a memory control function for writing the image data appearing on the CPU bus 14 in the image display memory 34 or reading the image data out of the memory 34.

Figure 5:
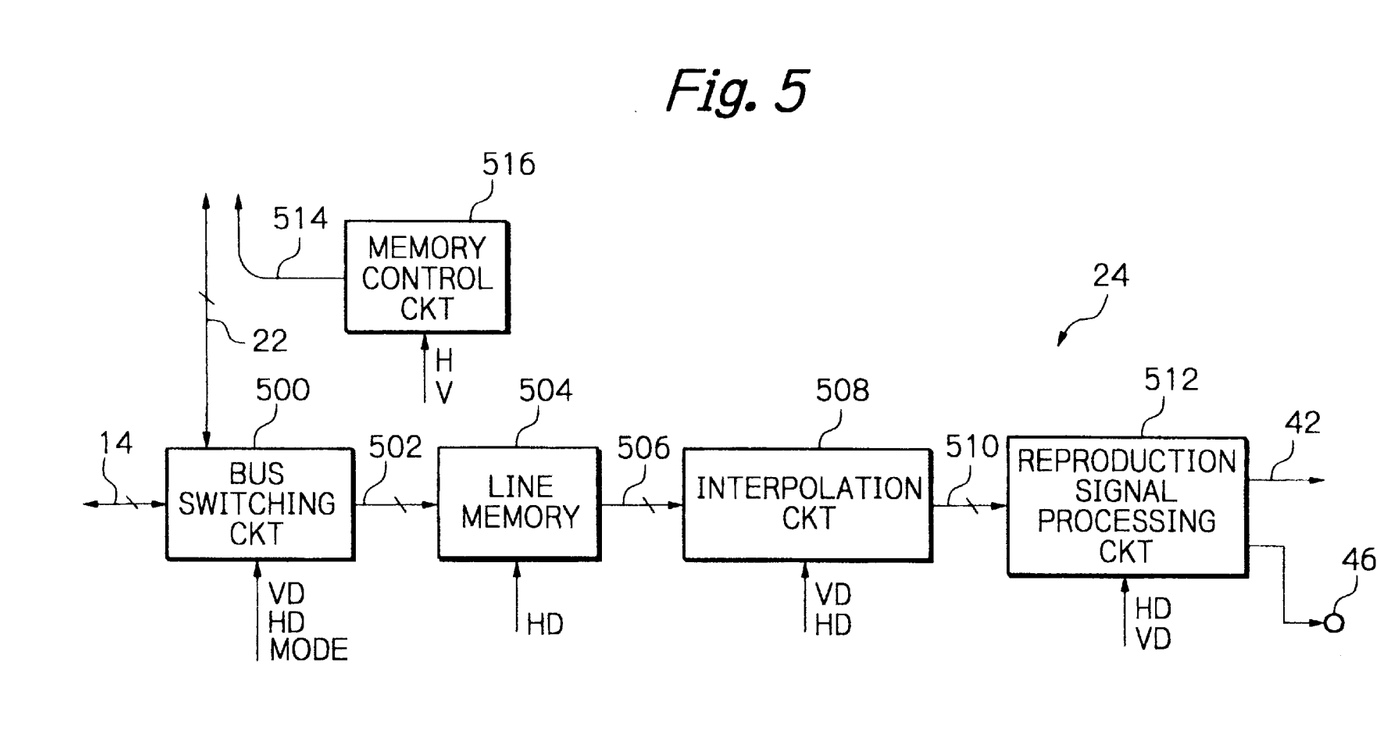
FIG. 5 is a schematic block diagram showing a specific configuration of a reproduction signal processing section also included in the illustrative embodiment.

FIG. 5 shows a specific configuration of the reproduction signal processing 24. As shown, the processing 24 includes a bus switching circuit 500 for selecting either one of the CPU bus 14 and image bus 22 and producing signals input to the bus 14 or 22 selected on its output 502. A line memory 504 is connected to the output 502 of the bus switching circuit 500 for converting the bus width of thirty-two bits to a bus width of sixteen bits, thereby separating and restoring the image data whose one pixel has sixteen bits. An interpolating circuit 508 is connected to the output 506 of the line memory 504 for interpolating the YC image data to an image size matching with the destination. A reproduction signal processing circuit 512 is connected to the output 510 of the interpolating circuit 508 for transforming the image data to a format matching with the destination or equipment and thereby reproducing a displayable image. A memory control circuit 516 controls, via a control bus 514, the writing and reading of the image data transferred via the image bus 22 out of the image display memory 34.

Assume that in the play mode image data read out of the data recording medium 20 and then decoded or otherwise processed are fed to the reproduction signal processing 24 to be reproduced thereby. Then, the bus switching circuit 500 selects the CPU bus 14 for inputting the above image data and then selects the image bus 22 for writing the image data in the image display memory 34. Subsequently, when the image data are read out of the image display memory 34, the bus switching circuit 500 inputs the image data appearing on the image bus 22. In the movie mode or the record mode, the bus switching circuit 500 selects the image bus 22 to input the image data appearing on the image bus 22 and delivers them to the line memory 504. To control such writing and reading of the image data out of the image display memory 34, the memory control circuit 516 sends an address signal, a write control signal and a read control signal to the image display memory 34 via the control bus 514.

The line memory 504 plays the role of a buffer for converting the thirty-two-bit YC image data coming in through the input 502 to sixteen-bit data. Specifically, in the illustrative embodiment, the line memory 504 separates sixteen-bit pixel-by-pixel data from two pixels of thirty-two-bit data received via the image bus 22 at a time and produces them on its output 506 in parallel.

The interpolating circuit 508 adjusts the image data coming in through its input 506 to an image size matching with the designation of the reproduction signal processing 24. For example, to change the number of pixels on one line from b to a, where a and b are natural numbers, the interpolating circuit 508 interpolates pixels by, e.g., preinterpolation or weighted mean interpolation and feeds the interpolated data to the reproduction signal processing circuit 512.

Specifically, assume that the image data stored in the image memory 34 have 640 pixels in the horizontal direction produced by thinning 1,280 pixels of image data in the same direction. Then, the interpolating circuit 508 restores the original 1,280 pixels by interpolation when the image data are read out of the image memory 34. Also, the interpolating circuit 508 increases the number of lines from 512 to 1,024 by interpolation in the vertical direction of the image. In this manner, if a multipixel system using the high pixel density pickup device 10 is available, and if the hardware of a reproducing apparatus including a display is adaptive to multiple pixels, the interpolating circuit 508 interpolates b pixels in order to output a pixels. When a display based on, e.g., NTSC (National Television System Committee) standards is connected to the reproducing side, the image data may be output without any interpolation. The output of the interpolating circuit 508 is connected to the reproduction signal processing circuit 512.

The reproduction signal processing circuit 512 reproduces signals matching with the signal input system of the monitor 26 connected to an output 42 or that of a TV (television) monitor or similar display connected to an output terminal 46 via, e.g., a video cable. In response to a timing control signal 48 fed from the reproduction timing controller 44, the circuit 512 causes an image represented by the image data read out of the image display memory 34 to be continuously displayed, thereby reproducing moving picture data or still picture data. When the reproduced image should be displayed on the monitor 26, the circuit 512 transforms the YC data to the RGB data format before delivering them to the monitor 26.

Assume that the image signal should be output to a TV monitor, video printer or similar video equipment connected to the output terminal 46 of the reproduction signal processing circuit 512. Then, the circuit 512 converts the YC data to NTSC analog video signals, adds synchronizing signals synchronous to a timing control signal to the video signal, and delivers the video signals with the synchronizing signals to the video equipment via the output terminal 46. In this manner, the circuit 512 encodes the image data coming in through the image bus 22 to a video signal whose format matches with the destination. The output of the circuit 512 constitutes the output 42 of the reproduction signal processing 24. The monitor 26 connected to the output 42 may be implemented by a monitor including an RGB color LCD panel. The monitor 26 selectively effects the real-time display of a moving picture being picked up or the display of a picture represented by image data read out of the data recording medium 20.

The reproduction timing controller 44 generates various timing signals based on the reference clock and generates a particular drive signal meant for the reproduction signal processing 24 in accordance with each timing. Among the timing signals, a horizontal synchronizing signal HD and a vertical synchronizing signal VD are delivered to the interpolating circuit 508. In this manner, the controller 44 defines the second time base for the image reproduction system and drives the various sections of the reproduction signal processing 24.

In the reproduction signal processing 24, the memory control circuit 516 controls, via the control bus 514, the writing and reading of the image data transferred to the image bus 22 out of the image display memory 34. For example, in the movie mode or the record mode, the circuit 516 outputs to the control bus 514 memory control signals made up of an address data and a read enable signal for outputting the image data stored in the image display memory 34 to the image bus 22. In the play mode, the circuit 516 outputs to the control bus 514 memory control signals made up of address data and a write control signal for writing the image data being transferred from the CPU bus 14 to the image bus 22 via the bus switching circuit 500 in the image display memory 34. The image display memory 34 delivers the image data appearing on the image bus 22 to the bus 22 in accordance with the memory control of the processing 24. In this manner, the processing 24 reproduces the image data being transferred via the image bus 22 to thereby output reproduced image signals for displaying, e.g., a corresponding moving pictures.

In FIG. 1, the communication signal processing 40 is an interface for processing the image data input via the CPU bus 14 and transferring the resulting data to equipment connected to its output terminal 50. Specifically, the processing 40 adds synchronizing data and an error check code to the input data in accordance with a timing signal 54 fed thereto from the communication timing controller 52. The input data with the synchronizing data and error check code are sent to the equipment in the form of packets. In the illustrative embodiment, the processing 40 transfers, based on the IEEE 1394 standard, the image data in an isochronous mode at a guaranteed image data transfer rate. The output 50 of the processing 40 is implemented by, e.g., USB (Universal Serial Bus) or CE Bus for home LAN (Local Area Network) applications and may be connected to a personal computer or similar equipment. When the packetized data are to be sent via a digital communication path, a wired or a wireless digital communication unit will be connected to the output 50 in order to digitize the image data.

The communication signal processing 40 may be connected to the image bus 22, if desired. In such a case, the processing 40 will advantageously function in the same manner as the bus switching circuit 500 and memory control circuit 516 and transfer the image data output from the image signal processing 12 to the image bus 22. Further, the processing 40 may send the compressed data output from the compression/expansion 16 or the non-compressed image data via the output 50. The communication timing controller 52 generates a packet synchronizing signal and other timing signals necessary for the operation of the processing 40, i.e., timing signals 54 conforming to the communication path and communication system.

In the illustrative embodiment, the image signal processing 12, pickup timing controller 32, image display memory 34, reproduction signal processing 24, reproduction timing controller 44 and image bus 22 are formed on a single semiconductor substrate. Also formed on the semiconductor substrate are the main controller 30, general memory 36, and CPU bus 14. These constituents are sealed in a preselected package so as to constitute a single chip, multifunction processing unit for digital image pickup equipment. In this case, the CPU bus 14 in particular is led out to the outside of the package by connection terminals in order to interchange information with outside circuitry.

Figure 6:
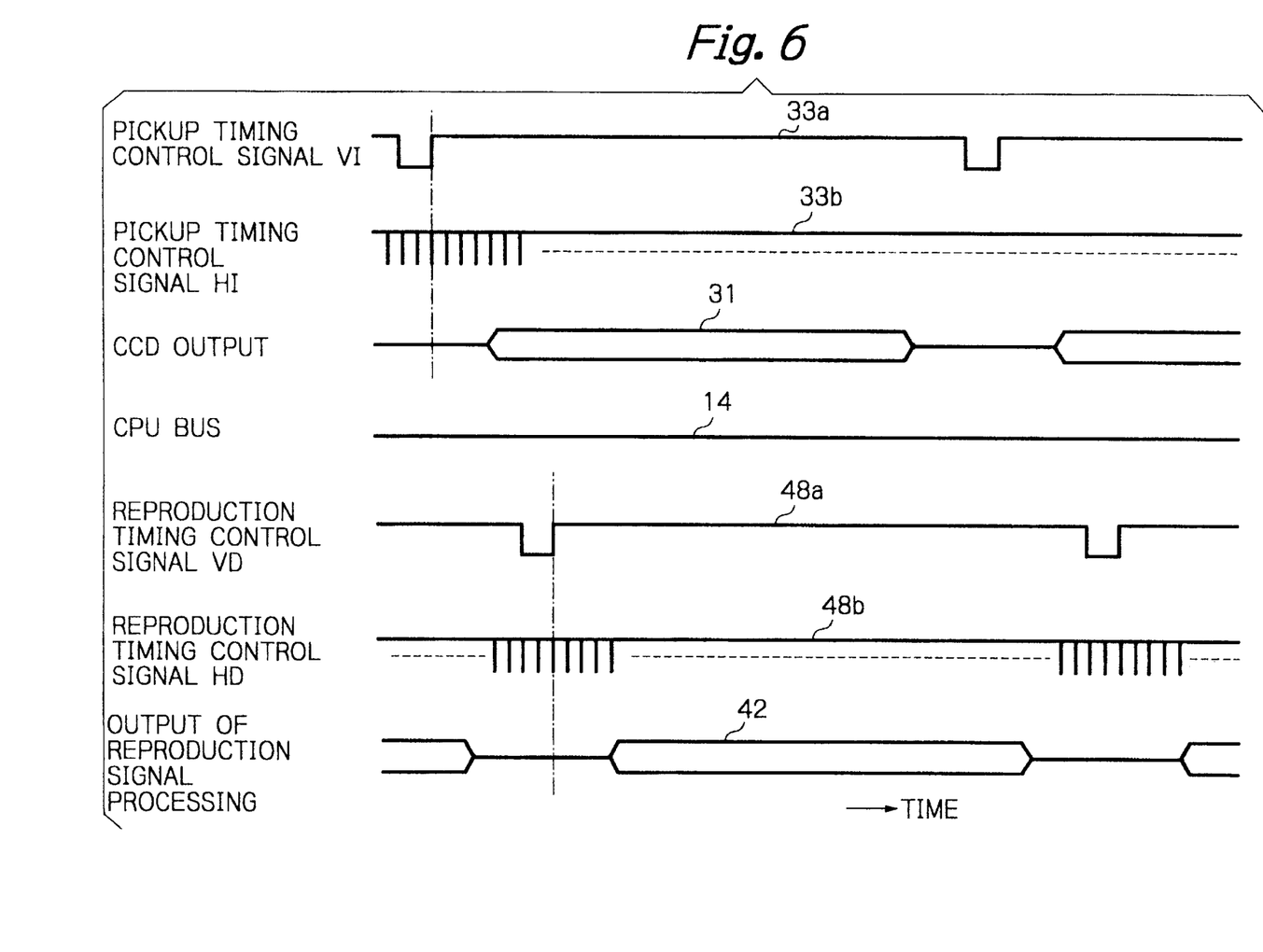
FIGS. 6, 7 and 8 are timing charts demonstrating the operations of various sections of the illustrative embodiment occurring in a movie mode, a record mode, and a play mode, respectively.
Figure 7:
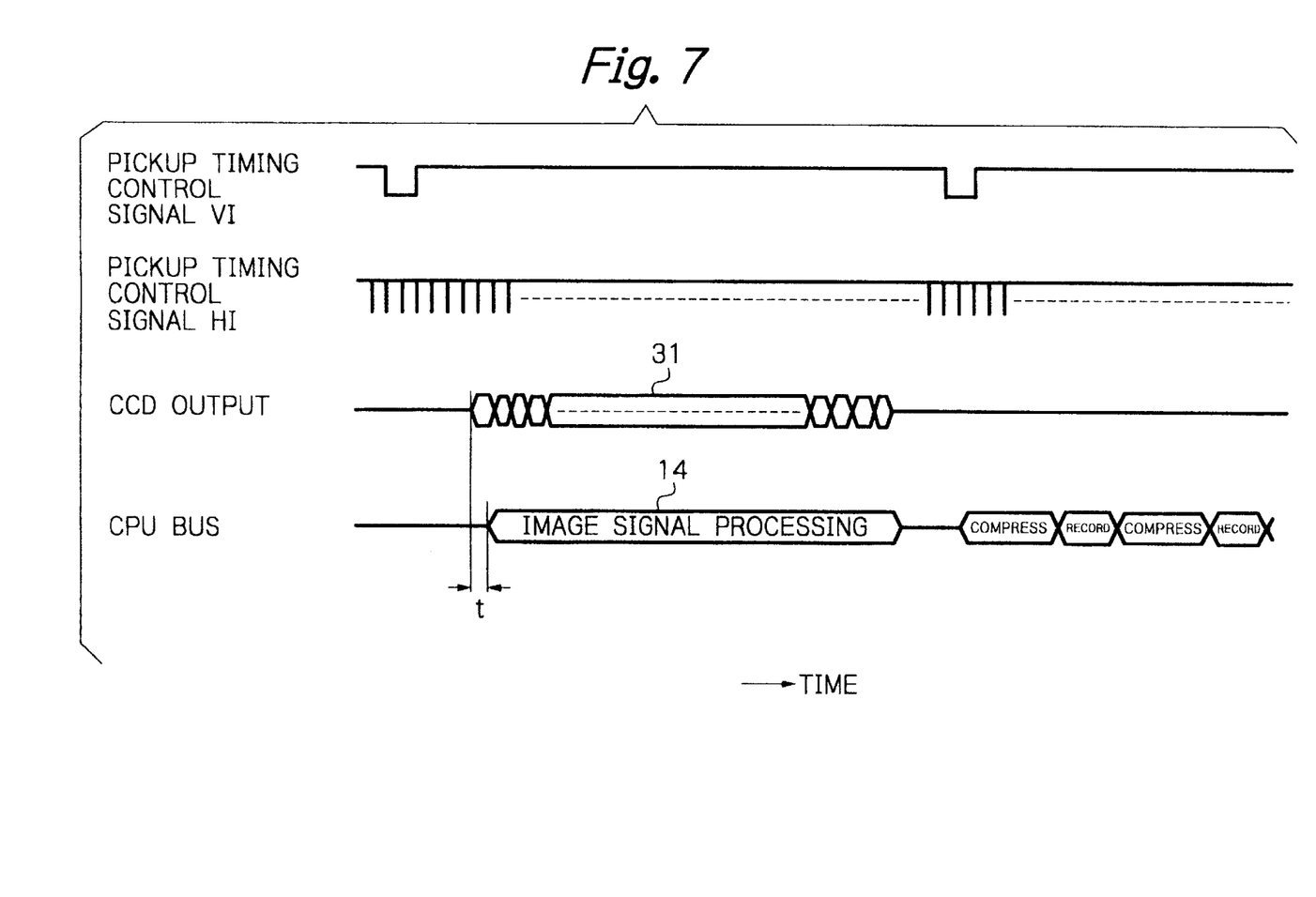
Figure 8:
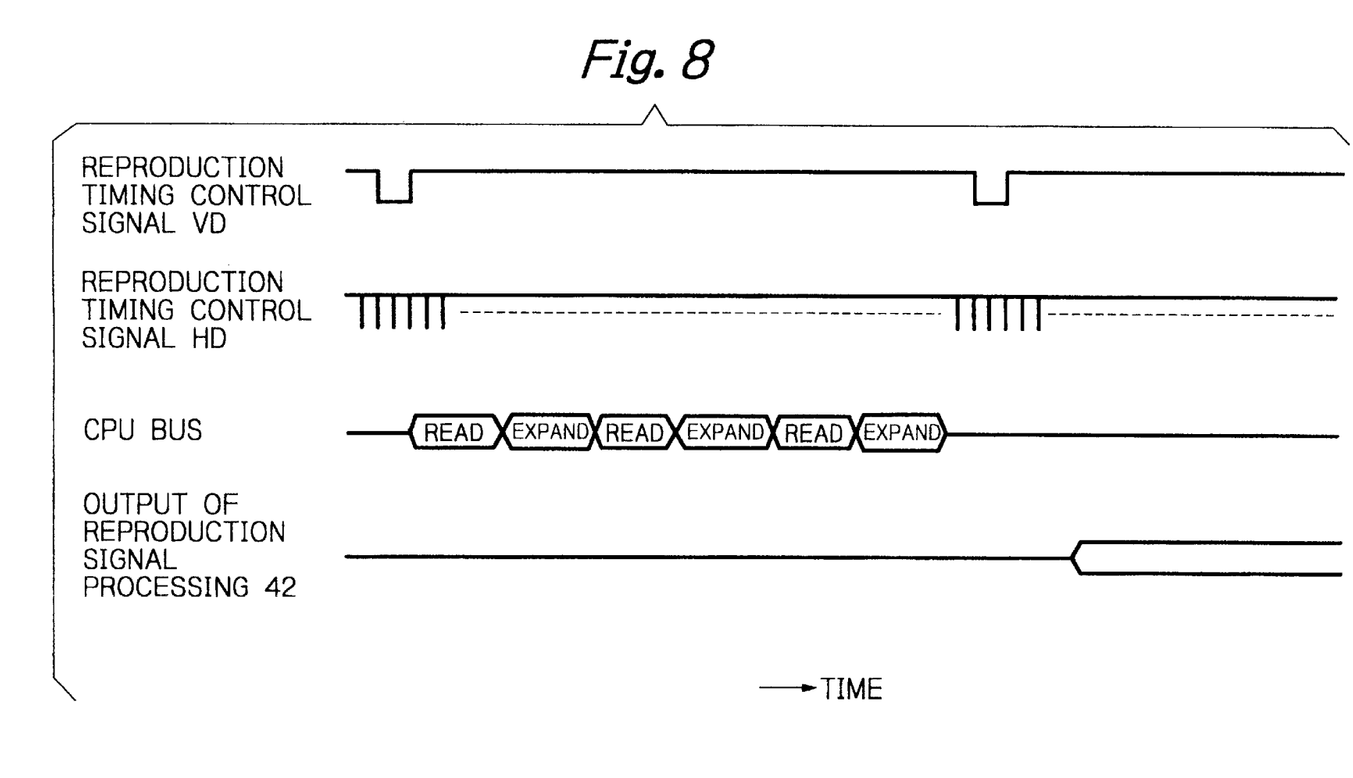

The operation of the camera 1 will be described with reference to FIGS. 6, 7 and 8. When the operator of the camera 1 turns on the power switch and then the display switch, as stated earlier, the main controller 30 sets up the movie mode. As shown in FIG. 6, in the movie mode, pickup timing signals 33a (VI) and 33b (HI) are fed to the image pickup device 10 and image signal processing 12, causing the outputs 31 of the device 10 to be sequentially input to the image signal processing 12.

The image signal processing 12 processes the image signals in accordance with the timing signals 33a and 33b. The resulting image data output from the processing 12 are written to the image display memory 34 via the image bus 22 because the output 14 of the processing 12 is in a high impedance state. At the same time, the processing 12 delivers the write control signal 216 to the image display memory 34 via the control bus 216. As a result, the image data output from the processing 12 do not appear on the CPU bus 14; the CPU bus 14 remains idle except when the control of, e.g., the main controller 30 and data transfer occur. In this condition, the main controller 30 may remain in the sleep state while lowering the clock rate or may perform calculations low in processing load, e.g., calculations for the pickup control which will be described later specifically.

The image data appearing on the image bus 22 are written to the image display memory 34 in accordance with the write control signal 216. The image data stored in the memory 34 are read out in accordance with the read control signal 514 output from the reproduction signal processing 24 which is driven in synchronism with reproduction timing signals 48a (VD) and 48b (HD) The image data read out of the memory 34 are input to the reproduction signal processing 24. This processing 24 transforms the input image data to RGB image data and delivers the RGB image data to the monitor 26 in accordance with the timing signal 48. The procedure described so far is repeated to display a moving picture being picked up by the image pickup device 10 on the monitor 26. If a TV monitor is connected to the output terminal 46, the reproduction signal processing 24 will generate the conventional video signal and sends it to the TV monitor via the output terminal 46. If desired, a video printer, video recorder or similar equipment other than theexceedings may be connected to the output terminal 46 in order to print or record the moving pictures.

Assume that the reproduction signal processing 24 has a processing ability comparable with or exceeding, e.g., the output transfer rate of the image signal. Then, the image data output from the image signal processing 12 to the image bus 22 may be directly input to the reproduction signal processing 24 and reproduced thereby. This alternative configuration is desirable when, e.g., the image pickup side reduces the image size for reducing the amount of one frame of data to be transferred to the image bus 22. Conversely, when the image pickup side outputs the image data to the image bus 22 without, e.g., thinning which would reduce the image size, it is preferable to use the image display memory 34 for buffering difference in processing rate at the time of the continuous display of consecutive frames.

In the illustrative embodiment, the movie mode can be automatically replaced with the record mode, as follows. Assume that the operator of the camera 1 performs framing while watching an optical finder or the monitor 26 and then turns on the release switch. Then, the image data output from the image signal processing 12 are sequentially written to the general memory 36 via the CPU bus 14. The main controller 30 produces, based on the image data, an estimated luminance value and an estimated auto-focus value and then controls the focal point of the lens and exposure in accordance with the estimated values.

The main controller 30 may advantageously be adapted to cancel the sleep mode and execute the above pickup control when the operator presses the shutter release button halfway or touch the release button, in which case the controller 30 will set up the record mode when the button is fully pressed later. Further, such pickup control may be intermittently executed at preselected intervals in the movie mode.

If the operator continuously turns on the release switch after the above pickup control, the main controller 30 controls the various sections of the camera 1 to the record mode. As shown in FIG. 7, in the record mode, the image signal processing 12 executes high image quality processing with pixel signals output from the image pickup device 10 and delivers high resolution, YC image data representative of, e.g., a 1,280×1,028 pixel picture to the CPU bus 14. These image data are written to the general memory 36 via the CPU bus 14 by being transferred by DMA transfer. After such image transfer, the output of the image signal processing 12 is again brought to its high impedance state with the result that the CPU bus 14 is released from the output of the processing 12.

The image data stored in the general memory 36, as stated above, are compressed by the compression/expansion 16 block by block and then transferred to the record/reproduction 18. The record/reproduction transforms the coded data output form the compression/expansion 16 to a record format particular to the data recording medium 20 and writes them in the medium 20. Such a procedure is repeated to store still picture data representative of a single frame in the medium 20.

While the compression and recording of the image data output from the image signal processing 12 are under way, the next image to be picked up may be fed from the image signal processing 12 to the image bus 22 and displayed on the monitor in the same manner as in the movie mode. This allows the operator to perform framing for another shot. As for the monitor display in the record mode, control over the CPU bus 14 and control over the image bus 22 are executed independently of each other. This is successful to effect image recording and moving picture display in parallel without increasing the processing load on the main controller 30 and therefore to reduce the amount of data transfer via the CPU bus 14.

To select the play mode for reproducing image data stored in the data recording medium 20, the operator turns the previously mentioned mode set dial to the play position. In response, the main controller 30 controls the various sections of the camera 1 to the play mode. As shown in FIG. 8, in the play mode, image data are read out of the medium 20 by the memory control function of the record/reproduction 18 and then expanded by the compression/expansion 16. The expanded image data are sequentially written to the general memory 36 and then transferred to the reproduction signal processing 24 via the CPU bus 14. The reproduction signal processing 24 delivers the input image data to the image bus 22. As a result, the image data are written to the image display memory 34 in response to a write control signal 514 fed from the processing 24 to the memory 34. After image data representative of a desired frame have been fully written to the memory 34, the processing 24 feeds a read enable signal 514 to the memory 34. Consequently, the stored image data are transferred to the processing 24 via the image bus 22 without the intermediary of the CPU bus 14. The processing 24 causes the desired frame to appear on the monitor 26.

While the desired frame is appearing on the monitor 26, the CPU bus 14 is basically idle and allows the main controller 30 to get into the sleep state. By using the idle CPU bus 14, the main controller 30 may receive image signal from the image signal processing 12 via the CPU bus 14 and record them in a compressed form or may command the communication signal processing 40 to send the image data stored in the general memory 36.

Further, if the frame being displayed is stored in the general memory 36, image data representative of the frame may be subjected to various kinds of filtering, color correction and/or resizing and then delivered to the reproduction signal processing 24. This allows the image to appear on the monitor 26 with desired image effects. For example, the main controller 30 may map image data representative of the reduced images of a plurality of frames stored in the recording medium 20 in the general memory 36 as a single frame so as to display thumbnail pictures on the monitor 26.

When the operator turns the mode set dial to the communication mode, the main controller 30 controls the various sections to the communication mode. In this mode operation, image data read out of the data recording medium 20 are input to the communication signal processing 40. The communication signal processing 40 sends the input image data via the output terminal 50 in synchronism with the timing control signal fed from the communication timing controller 52. In this case, communication control conforming to equipment connected to the output 50 is executed. For example, the image data are assembled in packets and then sent to the equipment at a rate matching with the equipment and transmission path. On the other hand, image data, for example, output from the equipment may be input to the communication signal processing 40 via the output 50, in which case the processing 40 will disassemble, e.g., input packets, separate the image data, and deliver the image data to the CPU bus 14. These image data will be once written to the general memory 36 and then fed to the reproduction signal processing 24 to be displayed in the form of a picture or may be read out of the memory 36 to be compressed and recorded in the medium 20.

As stated above, in the movie mode, image data output from the image signal processing 12 are transferred to the reproduction signal processing 24 without the intermediary of the CPU bus 14, allowing a picture to be displayed on the monitor 26 at a high speed. It follows that a scene being picked up can be displayed without being effected by the processing of the main controller 30. Further, the amount of information to be transferred via the CPU bus 14 is successfully reduced. Moreover, the clock rate, for example, meant for the main controller 30 is lowered to save power. In addition, when the main controller 30 needs image data for, e.g., pickup control during movie mode operation, it can obtain the image data via the CPU bus 14 and execute pickup control in parallel while displaying a picture being picked up on the monitor 26.

On the other hand, in the record mode, calculations for compression coding and other processing can be effected at a high speed by making most of the information transferability of the CPU bus 14. During this mode operation, too, an image output from the image signal processing 12 to the image bus 22 can be displayed on the monitor 26 by real-time processing. Further, in the play mode, after image data have been transferred from the medium 20 to the reproduction signal processing 24, the main controller 30 connected to the CPU bus 14 is capable of executing another processing or remaining in the sleep state during an interval between works.

As stated above, in the illustrative embodiment, the image signal processing 12 and reproduction signal processing 24 directly control the image display memory 34. It is therefore possible to reduce the amount of information to be transferred via the CPU bus 14 during real-time movie mode operation. This allows compression, image communication and other processing using the general memory 36 connected to the CPU bus 14 to be executed without muting a picture appearing on the monitor 26. Further, while compression and the writing of coded data in the medium 20 are under way, image signals output from the image pickup device 10 can be processed independently in order to display moving pictures. Such multiplex processing reduces a black-out time, i.e., a period of time during which an image disappears, and allows one shot to be immediately followed by image display or pickup control for preparing for the next shot. The camera 1 is therefore extremely easy and convenient to operate.

Moreover, in the movie mode, image data are transferred from the image signal processing 12 to the image bus 22 and, if necessary, to the reproduction signal processing 24 via the image display memory 34. It is therefore possible to lower the operation clock frequency assigned to the main controller 30 or to interrupt the operation of the other circuitry, i.e., to control each section of the camera 1 to the sleep state or a stand-by or idle status. This successfully reduces the power consumption of the entire camera 1 and thereby extends the drive time available with a battery.

In summary, in accordance with the present invention, an image signal processing apparatus includes a first bus for recording image data representative of a still picture in a data recording medium and a second bus for displaying, e.g., moving pictures on a monitor. The first and second buses can be used to execute multiplex processing. This allows a smooth moving picture to be displayed for a monitoring purpose and prevents the amount of data to be transferred to the first bus from increasing even when image data representative of a shot are compressed and recorded. The compressing and recording procedure can therefore be efficiently executed while a picture represented by the above image data can be rapidly displayed on the monitor.

Furthermore, image signal processing means and reproducing and outputting means relating to the second bus are operable independently of the operation using the first bus. Therefore, even during monitor display, control means, for example, can efficiently execute necessary operation by using the first bus. At this instant, it is possible to reduce the operation rate of the control means and therefore power consumption and therefore to extend an operation time available with a battery. This makes the apparatus and therefore a digital camera using it easy to use even when the number of pixels is further increased for implementing high pixel density. In addition, the apparatus or the camera can execute still picture processing and moving picture processing adequately and output the resulting image data.

The entire disclosure of Japanese patent application No. 82693/1999 filed Mar. 26, 1999 including the specification, claims, accompanying drawings and abstract of the disclosure is incorporated herein by reference in its entirely.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. An image signal processing apparatus for processing an image signal output from an image pickup device, comprising:

an image signal processing device for processing the image signal and outputting resulting image data to either one of a first and a second output;

a first bus connected to said first output for transferring the image data;

a first storage connected to said first bus for storing the image data;

a recording device connected to said first bus for processing the image data read out of said first storage in a format matching with a data recording medium and recording resulting processed image data in said data recording medium;

a second bus connected to said second output for transferring the image data output via said second output;

a reproducing and outputting device connected to said first bus and said second bus for reproducing an image represented by the image data output via said second output and outputting a resulting reproduced image; and a main controller connected to said first bus for controlling said devices and first storage and setting an operation mode;

said image signal processing device comprising an output selector for selectively outputting the image data to said first output or said second output, wherein said image signal processing device outputs, when moving picture data are to be output, said moving picture data to said second output, but not to said first output, or outputs, when the image data are to be recorded in the data recording medium, said image data to said first output;

said reproducing and outputting device receiving the image data on said first bus or said second bus in accordance with the operation mode, reproducing said image data, and outputting reproduced image data to a monitor.

2. An apparatus in accordance with claim 1, wherein the monitor displays a moving picture represented by the reproduced image data fed from said reproducing and outputting device.

3. An apparatus in accordance with claim 2, wherein said image signal processing device generates the image data at a timing matching with a first time base for driving the image pickup device, said reproducing and outputting device reproducing said image data at a timing matching with a second time base for displaying the moving picture.

4. An apparatus in accordance with claim 1, further comprising a second storage connected to said second bus for storing the image data appearing on said second bus;

said image signal processing device further comprising a first storage controller for controlling writing of the image data in said first storage;

said reproducing and outputting means comprising a second storage controller for controlling writing of the image data in said second storage;

said image signal processing device and said reproducing and outputting device each controlling the writing of the image data in said second storage independently of an operation of said main controller.

5. An apparatus in accordance with claim 4, wherein said image signal processing device and said reproducing and outputting device each control addresses of said second storage.

6. An apparatus in accordance with claim 1, wherein said second bus has a bus width greater than a bit width of the image data output from said image signal processing device, said image signal processing device further comprising a first bus width converting device for converting the image data to image data matching with said bus width of said second bus.

7. An apparatus in accordance with claim 6, wherein said reproducing and outputting device comprises a second bus width converting device for converting the image data transferred by the bus width of said second bus to a bit width corresponding to a pixel of the image pickup device.

8. An apparatus in accordance with claim 1, wherein when said reproducing and outputting device is outputting the image data, said main controller processes the image data output to said first bus by using said first bus.

9. An apparatus in accordance with claim 1, wherein said recording device comprises an encoding circuit for encoding the image data transferred over said first bus by compression, and a record control circuit for recording the image data encoded by said compressing coding circuit in the data recording medium;

said apparatus encoding, when said reproducing and outputting device is displaying an image on the monitor, the image data appearing on said first bus by compression and recording resulting encoded image data in the data recording medium.

10. An apparatus in accordance with claim 9, wherein said encoding circuit includes a circuit for expanding image data encoded by compression and read out of the data recording medium, said main controller feeding expanded image data output from said encoding circuit to said reproducing and outputting device via said first bus;

said reproducing and outputting device reproducing and outputting the image data input on said first bus.

11. An apparatus in accordance with claim 1, wherein said main controller executes processing for varying an image size with the image data to be stored in said first storage.

12. An apparatus in accordance with claim 1, wherein said reproducing and outputting device varies an image size of the image data.

13. An apparatus in accordance with claim 1, wherein said image signal processing device varies an image size of the image data.

14. An apparatus in accordance with claim 1, further comprising a pickup driving device for driving the image pickup device, said reproducing and outputting device being driven in synchronism with said pickup driving device for reproducing and outputting the image data output from said image signal processing device.

15. An apparatus in accordance with claim 1, wherein said main controller gets into a power saving state when said reproducing and outputting device is displaying an image on the monitor.

16. An apparatus in accordance with claim 1, wherein when said reproducing and outputting device is displaying an image on the monitor, said main controller calculates estimated values based on the image data output from said signal processing device via said first bus and executes pickup control in accordance with said estimated values.

17. An apparatus in accordance with claim 1, further comprising a communication processing device for sending the image data processed by said image signal processing device to outside equipment connected to said apparatus.

18. An apparatus in accordance with claim 17, wherein said communication processing device sends the image data read out of the data recording medium to the outside equipment.

19. An apparatus in accordance with claim 1, wherein said first storage includes an area storing a program defining a processing sequence of said main controller, said main controller executing control in accordance with said program.

20. An apparatus in accordance with claim 1, wherein said apparatus comprises a digital camera including the image pickup device.

21. An apparatus in accordance with claim 1, said image signal processing device, said first storage, said second storage, said reproducing and outputting device, said first bus and said second bus are formed on a single semiconductor substrate.

* * * * *